United States Patent [19]
Kobald et al.

[11] 3,734,225
[45] May 22, 1973

[54] HYDROSTATIC DRIVE FOR A MOTORCAR

[75] Inventors: Walter Kobald, Stuttgart-Feuerbach; Eckehart Reichel, Gerlingen, both of Germany

[73] Assignee: Robert Bosch GMBH, Stuttgart, Germany

[22] Filed: Apr. 5, 1971

[21] Appl. No.: 131,152

[30] Foreign Application Priority Data

Apr. 4, 1970   Germany .................. P 20 17 771.3

[52] U.S. Cl. ............................. 180/66 R, 60/53 R
[51] Int. Cl. .......................................... B60k 17/10
[58] Field of Search ................ 180/66 R; 60/53 R, 60/53 A

[56] References Cited

UNITED STATES PATENTS

| | | | |
|---|---|---|---|
| 3,465,520 | 9/1969 | Hann | 60/53 A |
| 3,186,170 | 6/1965 | Gauthier et al. | 60/53 R |
| 3,331,480 | 7/1967 | Christenson et al. | 60/53 R X |
| 3,371,479 | 3/1968 | Yapp et al. | 60/53 A X |

*Primary Examiner*—Benjamin Hersh
*Assistant Examiner*—Leslie J. Paperner
*Attorney*—Michael S. Striker

[57]  ABSTRACT

A hydrostatic drive for a motorcar includes a transmission having a driven pump, a hydraulic motor, and first and second conduits connecting the same so that the first conduit has high pressure while the pump is driven by a prime mover, and has low pressure when the car rolls downward on a slope. Pressure responsive means are influenced by the high pressure in the first conduit to adjust the control means of the hydraulic motor, but stop adjustment of the control means when the car rolls, and is braked by the transmission.

7 Claims, 7 Drawing Figures

INVENTORS:
Walter KOBALD
Eckehart REICHEL

BY their ATTORNEY

PATENTED MAY 22 1973

INVENTORS:
Walter KOBALD
Eckehart REICHEL

BY their ATTORNEY

HYDROSTATIC DRIVE FOR A MOTORCAR

BACKGROUND OF THE INVENTION

Hydraulic drives are known in which a hydrostatic transmission is driven by a prime mover, and includes a conduit means for moving the pressure fluid in closed circulation between the hydraulic pump and the hydraulic motor. A regulating means, responsive to the circulating pressure fluid, and preferably including a power amplifier, adjusts the control means of the hydraulic motor.

Pressure regulated drives of this type are widely used, and have a perfect regulating characteristic while the car is driven or accelerated. When the car arrives at an upward grade, the pressure in the hydrostatic transmission rises. At the predetermined maximum pressure, a pressure regulator operates the control means of the hydraulic motor by means of a power amplifier, so that the absorbed volume of the hydraulic motor becomes greater, together with the torque of the hydraulic motor, while its rotary speed is reduced. During uphill driving, the motorcar slows down, but has a greater torque available for overcoming the additional forces required during uphill movement.

Another advantage of the hydrostatic drives of this type, is that the hydrostatic transmission can be used as a brake, for example, by permitting the wheels of the car to drive the hydraulic motor as a pump when the car rolls downward on the slope. The motor, operating as a pump, supplies pressure fluid to the pump, which now operates as a hydraulic motor whose energy is consumed in the prime mover engine so that the hydraulic drive exerts a brake action.

The above-explained pressure regulation has, during braking, the disadvantage that the braking effect may be too strong due to the fact that the pressure regulator sets, when the pressure rises in the conduit means, the hydraulic motor to increased absorption volume, which, when the car rolls downhill, operates as a pump and causes the pump of the transmission to operate as a hydraulic motor. Due to the setting of the hydraulic motor to a greater volume, the rotary speed of the pump, which operates as a hydraulic motor, is undesirably increased. The torque required by the prime mover, is rapidly increased, so that the motorcar is too suddenly braked.

The U.S. Pat. No. 3,456,520 discloses a hydraulic drive as described above, provided with means which, during braking, set the hydraulic motor to the smallest possible stroke for the purpose of achieving a soft continuous braking. The arrangement has the disadvantage that the brake effect is interrupted in an uncontrolled manner due to the reduction of the stroke of the hydraulic motor operating as a pump during downhill rolling of the car.

SUMMARY OF THE INVENTION

It is one object of the invention to overcome the disadvantages of hydrostatic drives for motorcars, and to provide a hydrostatic drive which produces a desirable smooth braking effect under all conditions.

Another object of the invention is to prevent the adjustment of the control means of the hydraulic motor by pressure regulating means, while the car rolls downhill, and the hydraulic transmission operates as a brake.

In accordance with the invention, the pressure regulator which adjusts the control means of the hydraulic motor, is rendered ineffective while the hydraulic transmission serves as a brake during forward movement of the car, and to some degree also during reverse movement of the car. Due to this measure, the hydraulic motor operates as a constant motor, and is preferably blocked in a position corresponding to a maximum stroke, or also in intermediate positions.

It is particularly advantageous to adjust the control means of the hydraulic motor by regulating means to place the control means in an end position before the car starts rolling downhill, and the transmission acts as a brake.

A particularly simple solution is possible when the hydraulic drive has a pressure regulating means and power amplifier which is subjected to the high pressure in conduit means over a check valve. An auxiliary pump which compensates leakage losses, and has a safety valve set to a predetermined pressure, pumps through two check valve pressure fluid to the conduits of the hydraulic transmission in which lower pressure prevails, if the check valve is set to an opening pressure at least as great as the pressure at which the safety valve of the auxiliary pump opens.

A preferred embodiment of the invention comprises a prime mover engine; a hydrostatic transmission including a pump connected with the engine, a hydraulic motor connected with the motorcar and having control means for adjustment, and conduit means including first and second conduits connecting the pump with the motor; and pressure regulating means for the control means of the hydraulic motor.

When the engine drives the pump, the first and second conduits contain fluid at high pressure and low pressure, respectively, and when the car drives the motor on a downhill slope, the first and second conduits contain fluid at low pressure and high pressure, respectively.

The regulating means includes pressure responsive means, such as a differential piston, responsive to high pressure in the first conduit to adjust the control means of the hydraulic motor while the engine drives the pump. The pressure responsive means are also responsive to low pressure in the first conduit to stop adjustment of the control means while the car drives the motor as a pump on a downhill slope, and the motor, pump, and engine brake the motorcar.

In one embodiment of the invention, the pressure responsive means is responsive to a predetermined pressure higher than the low pressure, and lower than the high pressure in said first and second conduits, so that when the engine drives the pump, the pressure responsive means responds to the high pressure whereby the regulating means operates the control means to vary the absorption volume of the motor.

When the car drives the motor means as a pump on a downhill slope, the pressure responsive means does not respond to the low pressure in the first conduit whereby the control means is not operated by the regulating means when the motor, pump, and engine brake the motorcar.

In a first embodiment of the invention, the conduit means includes a reversing conduit communicating with the regulating means, and two check valves connecting the reversing conduits with the first and second conduits. Manual reversing valve means are provided in the reversing conduit means, and have an open position for forward drive, and a closed position for reverse drive. The check valves connect the regulating means only with one of the first and second conduits which contains fluid at high pressure.

In a modification, valve means are provided which have a first position connecting the first conduit with the regulating means and disconnecting the second conduit from the same, and a second position connecting the second conduit with the regulating means and disconnecting the first conduit from the same during reverse drive of the transmission. Preferably, the valve means has a third position, disconnecting the first and second conduits from the regulating means.

In another embodiment, the hydrostatic drive comprises an auxiliary pump for supplying fluid to the conduit means for replacing leakage losses; a safety valve for limiting the fluid pressure of the auxiliary pump to a predetermined pressure, a pair of check valves connecting the auxiliary pump with the first and second conduits, respectively, so that the auxiliary pump pumps only into the one of the first and second conduits in which the pressure is lower; and regulating check valve means connecting the first conduit with the regulating means and opening at a pressure at least equal to the predetermined pressure of the safety valve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 5b is an end view of the part shown in FIG. 5a; and

DESCRIPTION OF THE PREFERRED EMBODIMENTS

Figure 1:
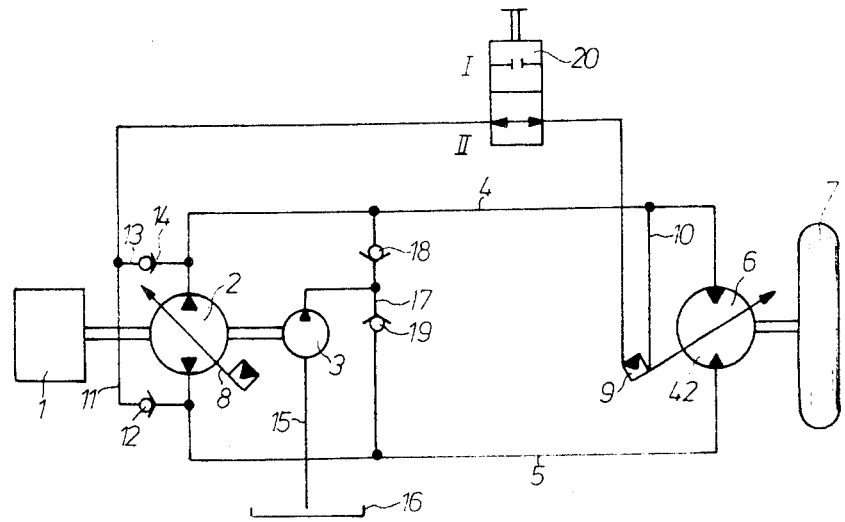
FIG. 1 is a fragmentary schematic view illustrating an embodiment of a hydrostatic drive, according to the invention.
Figure 2:
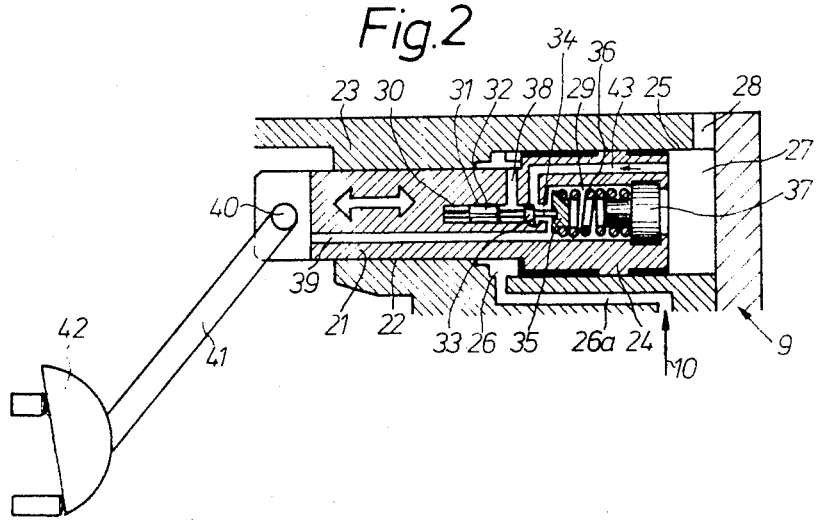
FIG. 2 is a fragmentary longitudinal sectional view illustrating regulating means in accordance with the invention for the hydrostatic drive shown in FIG. 1.

Referring first to FIGS. 1 and 2, a prime mover engine 1 drives a hydrostatic transmission including a pump 2, directly driven by engine 1, together with an auxiliary pump 3, and a motor 6 connected with pump 2 by a first conduit 4 and a second conduit 5. The hydraulic motor 6 is connected with one or more wheels 7 of a motorcar for which the hydrostatic drive of FIG. 1 is provided.

The direction in which a fluid flows through pump 2, and the volume of the pump fluid, is determined by control means, including a manually operated lever, not shown, which operates control means 8, if necessary by means of a power amplifier.

The amount of absorbed volume, or the stroke and direction of rotation of the hydraulic motor 6, is determined by means of a combined pressure regulator and power amplifier 9, to which reference will be made as "regulating means", which is schematically shown in FIG. 1, and in greater detail in FIG. 2.

Regulating means 9 is connected by a conduit 10 with conduit 4, and has a chamber 27 connected through a bore 28 with a reversing conduit 11.

In the proximity of the pump 2, the reversing conduit 11 is connected by two check valves 12 and 14 with the first and second conduits 4 and 5. Check valves 12 and 14 close toward conduits 4 and 5, and open, respectively, when the pressure in conduit 5 or in conduit 4 is high enough. Check valve 14 is disposed in a conduit 13 connecting reversing conduit 11 with the first conduit 4.

The auxiliary pump 3, which is driven from the engine 1, sucks fluid through a suction conduit 15 out of a container 16 and pumps the fluid through a conduit 17, in which two check valves 18 and 19 are provided into one of the conduits 4 and 5.

A reversing valve means 20 is provided in the reversing conduit 11, and has a normal position I interrupting reversing conduit means 11, and a reversing position II in which the reversing conduit 11 is connected with the regulating means 9.

Referring now to FIG. 2, the regulating means includes a pressure responsive differential piston 21,24 including a piston portion 21 of small diameter guided in a cylinder bore 22 of the regulating housing 23, and a larger piston portion 24 guided in a cylinder 25. Piston portion 24 divides the cylinder 25 into two pressure chambers 26 and 27. Pressure chamber 26 is connected by channel 26a with a conduit 10, also shown in FIG. 1, and communicating with the first conduit 4. Pressure chamber 27 is connected by a bore 28 with the reversing conduit means 11, as best seen in FIG. 1.

The pressure responsive differential piston 21, 24 has an inner cavity 29 connected with a bore 30, in which a control piston 31 is mounted for axial sliding movement. Control piston 31 has a piston portion 32 with longitudinal guide grooves, and a front piston portion 33 connected with a stem 34 which abuts a spring retainer plate 35. A compression spring 36 abuts at one end on retainer plate 35, and at the other end, a closure 37 which closes the space 29. A transverse bore 38 in piston portion 21, located between piston portions 32 and 33 of control piston means 31, always communicates with the annular pressure chamber 26 which surrounds the smaller piston portion 21 adjacent the shoulder of the larger piston portion 24.

From the space 29 of the differential piston 21,24, a longitudinal bore 39 extends to the rear end face of piston portion 21, and opens to atmospheric pressure. The piston portion 21 has an end portion 40 pivotally connected with an arm 41 which is attached to control means 42 of the hydraulic motor 6, as also schematically shown in FIG. 1. The schematic illustration of part 42 in FIG. 2 represents the piston plate of an axial piston pump.

Pressure chamber 27 at the wider end of the differential piston 21,24, is connected by a channel 43 with the bore 30, opening in the same at a point located between the front piston portion 33 of control piston 31 and the spring retainer plate 35. The play between bore 30 and the stem 34 forms a passage from the space 29 to the pressure chamber 27.

During forward drive of the motorcar, the first conduit 4 is the high pressure conduit of the hydrostatic transmission 2,6, and the second conduit 5 is the low pressure conduit. Auxiliary pump 3 pumps pressure fluid through the check valve 19 at low pressure in order to replace leakage losses. Check valve 18 is closed due to the higher pressure in conduit 4. The control means 8 are manually operated to determine forward or reverse drive, and the speed of the car. Reversing valve 20 is in position I in which the reversing conduit means 11 is interrupted.

The high pressure in the first conduit 4 increases the pressure in conduit 10, channel 26a, and pressure chamber 26 of the regulating means 9. The pressure in bore 38 and bore 30 is also increased. If the pressure in conduit 4 rises to a predetermined pressure due to increase of the resistance of the car to forward movement, for example, when the car is driven uphill, the pressure increase in bore 30 causes movement of the control piston means 31 against the action of spring 36, whereupon piston portion 33 establishes a communication between bore 38 and channel 43, and thereby between pressure chambers 26 and 27. The pressure of conduit 4 is now also produced in the pressure chamber 27, and the differential piston means 21,22 is shifted to the left as viewed in FIG. 2 toward the pressure chamber 26, so that the control means 42 of the hydraulic motor 6 is adjusted to a position in which the absorption volume is increased as compared with the preceding condition. As a result, the speed of the car is reduced, but the drive torque acting on the wheels 7 is increased.

If the pressure in the first conduit 4 drops below a predetermined pressure, spring 36 urges control piston 31 into bore 30 so that piston portion 33 and stem 34 form a connection between channel 43 and bore 39, in the position shown in FIG. 2. The pressure prevailing in pressure chamber 26 moves the differential piston 21,22 to the right, as viewed in FIG. 2, and the pressure fluid contained in the pressure chamber 27 can flow without pressure through the bore 39. The displacement of the differential piston 21,22 causes operation of the control means 42 so that the hydraulic motor 6 is set to a smaller absorption volume so that the pressure in the conduit means 4,5 again rises until piston portion 33 again interrupts communication between channel 43 and bore 39.

If the car rolls downward on a downhill slope, the hydraulic motor 6 is driven by the wheel 7 to operate as a pump by which the pump 2, now operating as the hydraulic motor, is driven, and consequently drives the engine 1, which may be a combustion engine. A torque is required for operating the hydraulic transmission in this manner, so that motor means 6, pump means 2, and engine 1 brake wheel 7 and the car. In this manner, the energy generated by the rolling car is at least partly compensated.

Due to the reversal of the functions of motor 6 and pump 2 during downhill rolling of the car, the first conduit 4 becomes the low pressure conduit, and the second conduit 5 becomes the high pressure conduit. Since the second conduit 5 is not connected with the regulating means 9, and since reversing valve means 20 is in the disconnecting position I, the absorption volume of the hydraulic motor 6 is not adjusted by control means 42 due to the fact that a low pressure in conduit 4 is insufficient to overcome the spring force of spring 36, so that the pressure responsive means 21,24 is not displaced for operating control means 42.

For driving the car in reverse, the reversing valve 20 is shifted to the position II, preferably by a manually operated member provided in the proximity of the control means 8 of the pump 2. Conduit 5 is the high pressure conduit, and conduit 4 is the low pressure conduit. The pressure regulator is effective only once for placing control means 42 by the pressure responsive means 21,22 in the position in which the hydraulic motor 6 has its greatest absorption volume, and the control means 42 are maintained in this position. For this purpose, pressure fluid at high pressure flows through check valve 12, reversing conduit 11, and reversing valve means 20 directly into pressure chamber 27 of the regulating means 9, acting on the large end face of the pressure responsive differential piston 21,22. Regulating means 9 is not influenced by pressure fluid in any other manner, since there is no conduit connected with conduit means 5 which would correspond to conduit 10, which is connected with conduit 4.

If during reverse moving, the car arrives at a downhill slope, hydraulic motor 6 starts to operate as a pump since it is driven by wheel 7, and pump 2 is operated at the hydraulic motor. Accordingly, the first conduit 4 contains high pressure fluid, and second conduit 5 contains low pressure fluid. Control means 42 of hydraulic motor 6 is set to a maximum stroke, as during reverse movement of the car on a horizontal road. Consequently, hydraulic motor 6 cannot be adjusted for further increasing its stroke, so that the brake effect which takes place is not increased and does not become too high. Hydraulic motor 6 is operated by wheel 7 in a manner of a pump having a constant stroke and volume.

Figure 3:
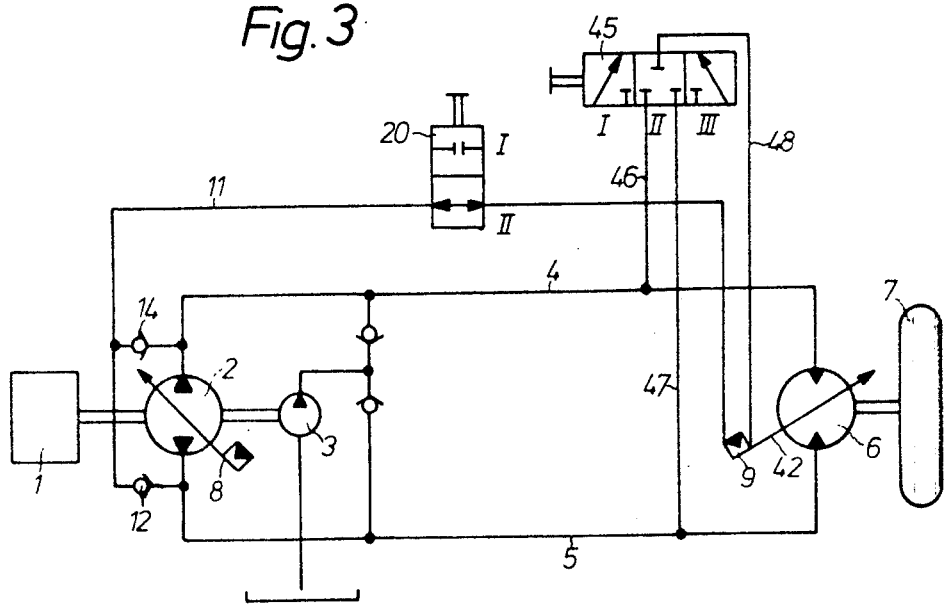
FIG. 3 is a schematic diagrammatic view illustrating another embodiment of the invention.

The embodiment of FIG. 3 corresponds to the embodiment of FIG. 1, and operates in the same manner. However, while in the embodiment of FIG. 1, a conduit 10 is directly connected with the first conduit 4, the embodiment of FIG. 3 includes a valve means 45 which has three positions I, II, and III, as schematically shown in FIG. 3. In position I, the first conduit 4 is connected by a conduit 46 and valve 45 with a conduit 48, which corresponds to conduit 10 of the embodiments of FIGS. 1 and 2. In the position III, the second conduit 5 is connected by conduit 47 and valve means 45 with conduit 48 and channel 26a of the regulating means 9. Conduit 47 consequently corresponds to a conduit 10 provided for the second conduit 5. In the third position of II of valve 45, conduits 4,46 and 5,47 are completely disconnected from conduit 48.

The embodiment of FIG. 3, and the provision of the valve 45, has the effect that the pressure regulation of the hydraulic motor 6 is always effective during reverse movement of the car on a horizontal road, and during uphill driving of the car. During forward movement of the car, valve 45 is in position I so that the high pressure in first conduit 4 is transferred to conduit 48 and by the same to regulating means 9, while the reversing valve 20 is in the closed position I. When the car rolls downhill, the pressure regulation of the control means 42 cannot be influenced since the connection between the second conduit 5 with the regulating means 9 is disconnected by reversing valve 20 so that the hydraulic motor 6 cannot be adjusted, and operates at constant absorption volume.

During reverse movement of the car, valve 45 is in the position III, and the high pressure, now in the second conduit 5, is transmitted through conduits 47 and 48 to the regulating means 9. If the car rolls downhill during reverse movement, the condition of the hydraulic motor 6 is not influenced, since the connection between conduit 4 and regulating means 9 is interrupted by valve 45. The position II of valve 45 is used when the car is to be driven at very low speed, for example, when a tractor pulls a plow.

From the above explanations, it is apparent that hydraulic motor 6 should not vary its stroke during downhill rolling of the car, when the hydraulic transmission and the engine 1 operate as the brake for the wheels 7 of the car. During such operations, the regulating means 9 may be without pressure, in which event the forces acting on the differential piston 21,22 have an undesired influence on the control means 42 of hydraulic motor 6. In order to overcome this disadvantage, the regulating means is modified as shown in FIGS. 4, 5a, and 5b.

Figure 4:
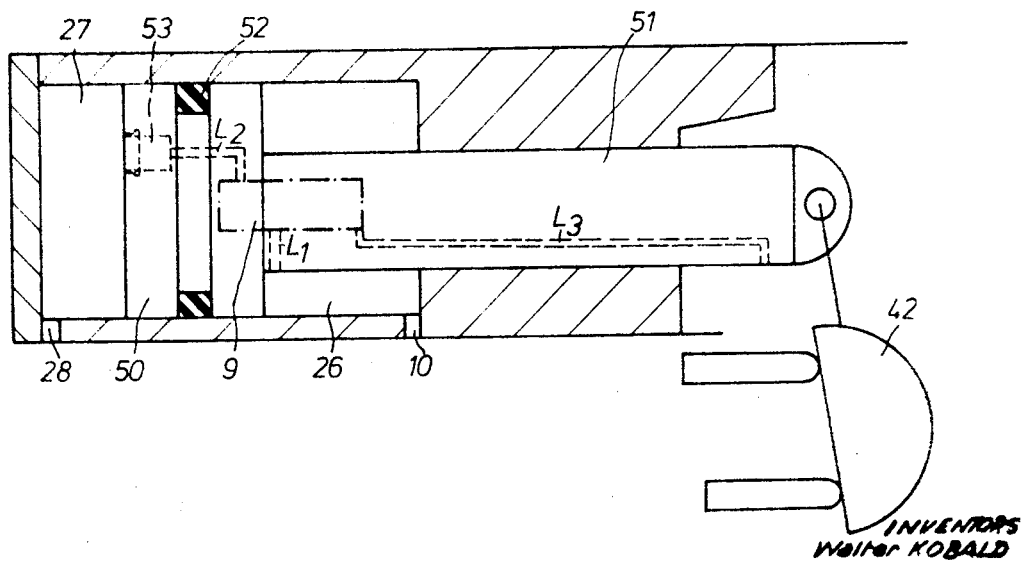
FIG. 4 is a fragmentary sectional view illustrating a modified regulating means in accordance with the invention.

FIG. 4 illustrates a combined pressure regulating means and power amplifier, corresponding to FIG. 2, in a simplified schematic illustration. The pressure regulator is shown in broken lines, since it is constructed in the same manner as the pressure regulating means 31,34,35,36,37. The conduit $L_2$ corresponds to conduit 43, the rectangle $L_1$ corresponds to the transverse bore 38, and the conduit $L_3$ corresponds to conduit 39 of the embodiment of FIG. 2. The function of the regulating means shown in FIG. 4 is exactly the same as the function of the regulating means shown in FIG. 2, and the main difference between the devices is the construction of the differential piston which, in the embodiment of FIG. 4, includes a portion of small diameter 51, and a portion of large diameter 50, which has two parts separated by a narrow piston portion 61 providing an annular groove for a packing ring 52 which engages the inner surface of cylinder 23 with high friction. The frictional engagement between the pressure responsive differential piston 50,51 and cylinder 23, prevents an accidental displacement of control means 42 of hydraulic motor 6 by forces exerted by the differential piston when the pressure chamber of the regulating means is without pressure during downhill rolling of the car.

Figure 5A:
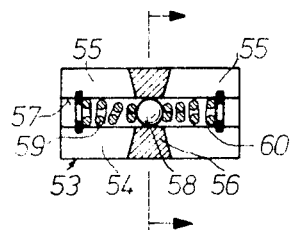
FIG. 5a is a sectional view illustrating a part of the regulating means of FIG. 4.
Figure 5B:
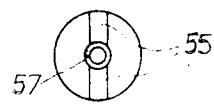

FIG. 5a and 5b illustrate a further modification of the regulating means by which the control means 42 of the hydraulic motor 6 can be arrested during downhill rolling of the car.

In the channel $L_2$ of the differential piston, as shown in FIG. 4, is placed an arresting valve 53, shown in FIG. 5a and 5b.

The arresting valve has a cylindrical housing 54 provided with slots 55 which leave only a central portion 56. A central bore 57 extends through housing 54, in which a ball-shaped valve member 58 is guided. In the position of rest, two springs 59 and 60 hold the ball valve member 58 in the region of portion 56. Springs 59 and 60 have such a pretension that they permit the passage of pressure fluid to control means only when a predetermined pressure is reached. In this manner, the forces of the differential piston cannot have any influence on the position of the control means 42 of the hydraulic motor 6.

In the arrangement described above, the control means 42 of hydraulic motor 6 is arrested during downhill rolling of the car in the same position in which it was while the car was moved by the prime mover engine 1. The hydraulic motor 6 has the effect of a constant stroke pump which, while the car rolls downhill, produces a fluid flow of constant volume, which is not increased. In the embodiment of FIGS. 5a and 5b, the control means 42 of hydraulic motor 6 is hydraulically blocked.

Figure 6:
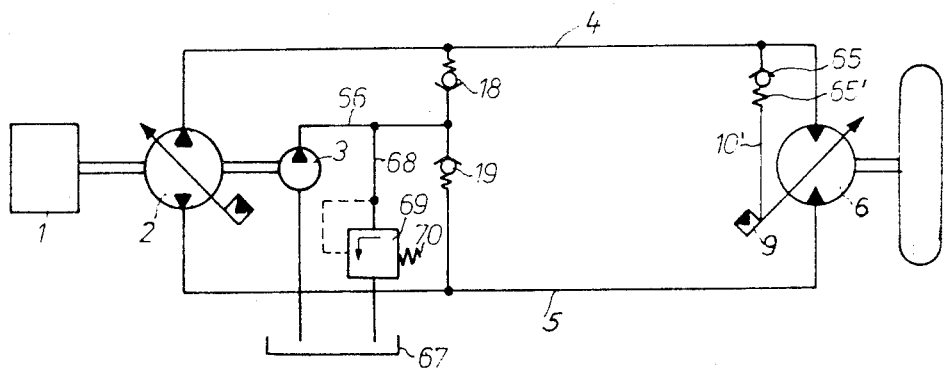
FIG. 6 is a schematic diagrammatic view illustrating a third embodiment of the invention.

The embodiment of FIG. 6 obtains the same effect in very simple manner. The general arrangement corresponds to FIG. 1, the reversing conduit 11, and the reversing valve means 20 being omitted. Conduit 10 is replaced by conduit 10' connecting conduit 4 with regulating means 9, and including a check valve 65 biased by spring 65'. Check valve 65 opens in the direction towards conduit 10' and regulating means 9, and away from conduit 4. The auxiliary pump 3 is connected by a conduit 66 with check valves 18 and 19, which communicate with conduits 4 and 5. A conduit 68 connects conduit 66 with a safety valve 69 which is biased by a spring 70 to discharge fluid pumped by auxiliary pump 33 at a predetermined pressure. The pressure at which safety valve 69 opens is slightly smaller, for example 8 atmospheres than the force of spring 65', which may be 12 atmospheres.

Regulating means 9 corresponds to the regulating means 9 illustrated in FIG. 2, but bore 28 is closed, and channel 26a is connected with conduit 10' through check valve 65.

During forward drive of the car, conduit 4 is the high pressure conduit, and the regulating means 9 receives pressure fluid through conduit 10' and check valve 65. Auxiliary pump 3 pumps at a pressure of about 8 atmospheres, while the check valve 65 is adjusted to open at the pressure of 12 atmospheres. Auxiliary pump 3 displaces fluid through the check valve 19 into the low pressure conduit 5.

When the car rolls downhill, conduit 5 becomes the high pressure conduit, and conduit 4 becomes the low pressure conduit from where pressure cannot be transmitted to the regulating means 9. In order to prevent a displacement of control means 42 of hydraulic motor 6 under all circumstances, which may occur due to forces exerted by the differential piston 21,24, the differential piston 21,24 is hydraulically arrested. This is due to the higher pressure required for opening check valve 65 as compared with the lower pressure required for opening the safety valve 69, since the pressure of the fluid pumped by the auxiliary pump 3 cannot be transmitted through check valve 65 to the regulating means 9. Pressure fluid between check valve 65 and regulating means 9 is completely enclosed, so that the differential piston 21,22 cannot move, and is hydraulically arrested. In this manner, it is prevented that control means 42 of the hydraulic motor 6 is adjusted to a smaller stroke which may cause undetermined driving conditions.

It will be understood that each of the elements described above, or two or more together, may also find a useful application in other types of hydrostatic drives differing from the types described above.

While the invention has been illustrated and described as embodied in a hydraulic transmission acting as a brake during downhill rolling of a car, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Hydrostatic drive for a motorcar having wheels, comprising a prime mover engine; a hydrostatic transmission including pump means connected with said engine, hydraulic motor means connected with said wheels of said motorcar and including control means for adjusting said motor means, and conduit means including first and second conduits connecting said pump means with said motor means so that when said engine drives said pump means, said first and second conduits contain fluid at high pressure and low pressure, respectively, and when said motorcar and wheels drive said motor means on a downhill slope, said first and second conduits contain fluid at low pressure and high pressure, respectively; regulating means for said control means connected with said first conduit and including pressure responsive means responsive to high pressure in said first conduit to adjust said control means while said engine drives said pump means, and responsive to low pressure in said first conduit to stop adjustment of said control means while said motorcar and wheels drive said motor means as a pump on a downhill slope, and said motor means, pump means and engine brake the motorcar; a reversing conduit means communicating with said regulating means; two check valves connecting said reversing conduit means with said first and second conduits, respectively; and reversing valve means in said reversing conduit means having an open position for forward drive, and a closed position for reverse drive of the motorcar; said check valves connecting said regulating means only with the one of said first and second conduits which contain fluids at high pressure when said reversing valve means is in said open position thereof.

2. Hydrostatic drive as claimed in claim 1 wherein said pressure responsive means is responsive to a predetermined pressure higher than said low pressure and lower than said high pressure so that when said engine drives said pump means, said pressure responsive means responds to said high pressure whereby said regulating means operate said control means to vary the absorbtion volume of said motor means, and so that when the motorcar drives said motor means as pump, said pressure responsive means does not respond to the low pressure in said first conduit whereby said control means is not operated by said regulating means when said motor means, said pump means and said engine brake the motorcar.

3. Hydrostatic drive as claimed in claim 1 wherein said pump means includes control means for adjusting the volume pumped by said pump means, and including a control member connected with said reversing valve means for operating the same.

4. Hydrostatic drive as claimed in claim 1 wherein said pressure responsive means include a cylinder means communicating with said first conduit, a differential piston means in said cylinder means dividing the same into two chambers, said piston means having a channel connecting said two chambers, and closure valve means in said channel responsive to low pressure in either of said chambers to automatically close said channel.

5. Hydrostatic drive as claimed in claim 1 wherein said pressure responsive means include cylinder means communicating with first conduit, a differential piston means in said cylinder means operatively connected with said control means, and an elastic packing ring on said piston means engaging said cylinder means at high friction for preventing displacement of said piston means when low pressure prevails in said first conduit and said motor means, pump means and engine are driven by the motorcar, and brake the same.

6. Hydrostatic drive as claimed in claim 1 comprising valve means having a first position connecting said first conduit with said regulating means and disconnecting said second conduit from the same, and a second position connecting said second conduit with said regulating means and disconnecting said first conduit from the same during reverse drive of said transmission.

7. Hydrostatic drive as claimed in claim 6 wherein said valve means has a third position disconnecting said first and second conduits from said regulating means.

* * * * *